(12) United States Patent
De Angelis et al.

(10) Patent No.: US 8,274,018 B2
(45) Date of Patent: Sep. 25, 2012

(54) APPARATUS FOR USE IN DIRECT RESISTANCE HEATING OF PLATINUM-CONTAINING VESSELS

(75) Inventors: Gilbert De Angelis, Lindley, NY (US); Chunhong C. He, Horseheads, NY (US); Weiwei Luo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 422 days.

(21) Appl. No.: 12/712,838

(22) Filed: Feb. 25, 2010

(65) Prior Publication Data

US 2011/0204039 A1   Aug. 25, 2011

(51) Int. Cl.
*F27B 14/00* (2006.01)
*C03B 5/02* (2006.01)
*C03B 9/48* (2006.01)

(52) U.S. Cl. ...................... 219/420; 65/135.6; 65/374.12

(58) Field of Classification Search ......................... None
See application file for complete search history.

(56) References Cited

U.S. PATENT DOCUMENTS

| | | | | |
|---|---|---|---|---|
| 4,142,881 A | * | 3/1979 | Louis | ................................ 65/40 |
| 5,131,005 A | * | 7/1992 | Takajo et al. | .................. 373/27 |
| 6,076,375 A | | 6/2000 | Dembicki et al. | ............... 65/326 |
| 7,013,677 B2 | * | 3/2006 | Singer | .............................. 65/327 |
| 2008/0050609 A1 | | 2/2008 | Abe et al. | ....................... 428/592 |
| 2008/0083250 A1 | | 4/2008 | Nagno et al. | ...................... 65/355 |
| 2008/0087046 A1 | | 4/2008 | Hirabara et al. | ................. 65/355 |
| 2008/0092597 A1 | | 4/2008 | Itoh et al. | ......................... 65/355 |
| 2009/0217709 A1 | * | 9/2009 | Adelsberg et al. | .............. 65/355 |

FOREIGN PATENT DOCUMENTS

DE    199 48 634    2/2005

\* cited by examiner

*Primary Examiner* — Scott B Geyer
(74) *Attorney, Agent, or Firm* — Kevin M. Able

(57) ABSTRACT

An apparatus for use in direct resistance heating of a molten glass-carrying vessel, such as a finer or connecting pipe, is provided. The apparatus comprises a flange comprises a plurality of electrically-conductive rings that include an inner ring joined to the vessel's exterior wall during use of the flange and an outer ring that receives electric current during use of the flange. The innermost ring comprises a high-temperature resistant metal preferably comprising at least 80% platinum, and the outermost ring preferably comprising at least 99.0% nickel. This combination of materials both increases the reliability of the flange and reduces its cost. Either one or both of the width or thickness of one or both of the inner or outer rings varies as a function of angular position relative to the vessel. The width and/or thickness of the inner and the outer rings with relation to each other produces a uniform current distribution in the flange and the vessel.

22 Claims, 8 Drawing Sheets

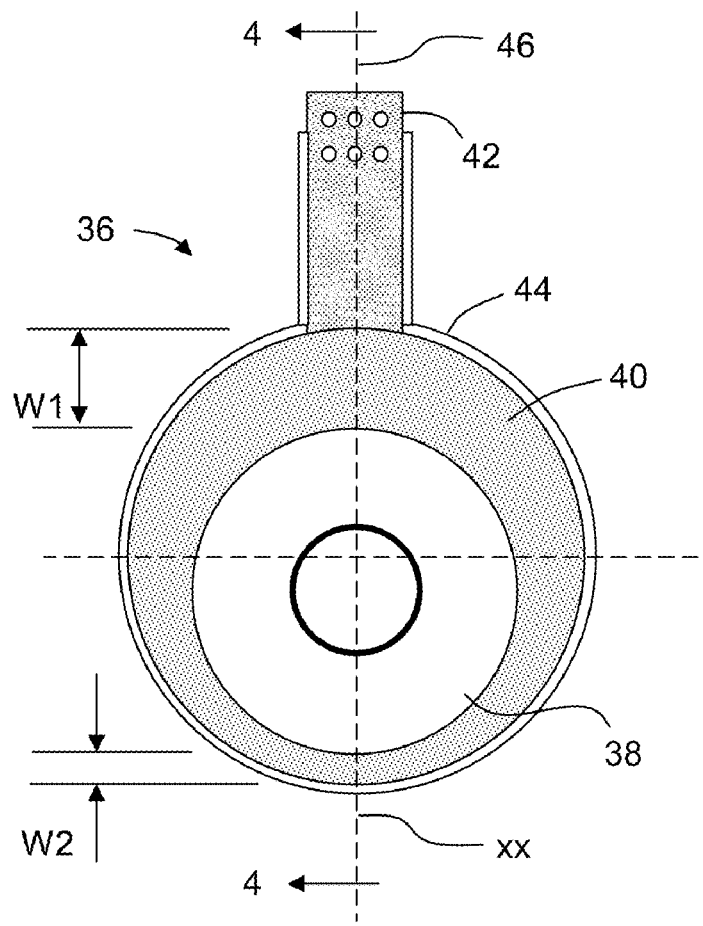
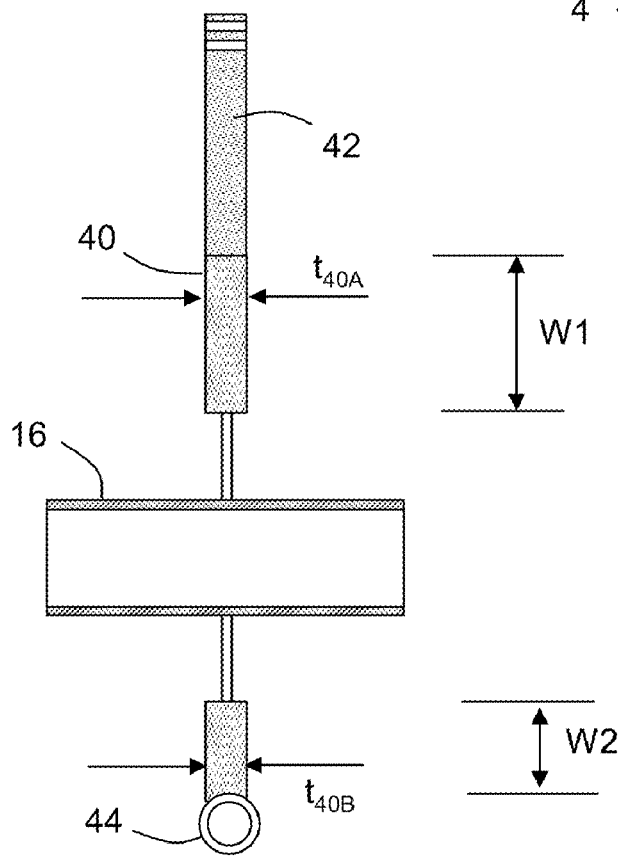
FIG. 3
FIG. 4

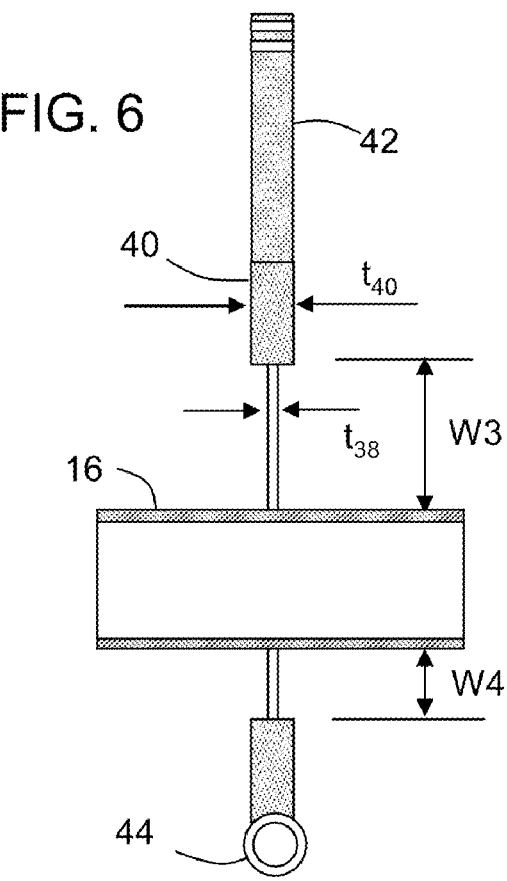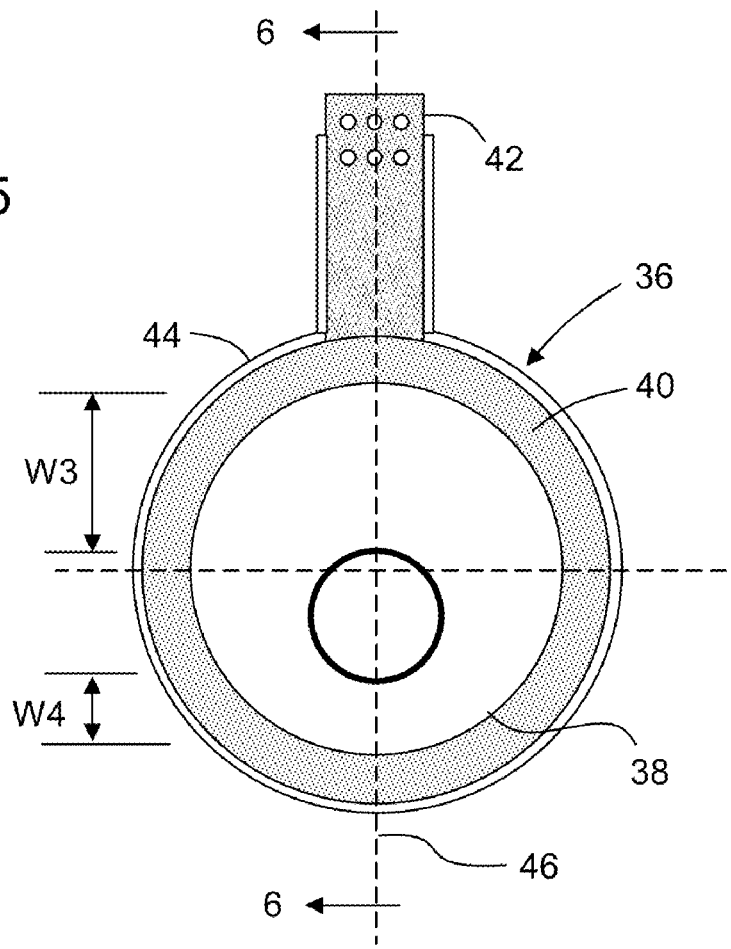

US 8,274,018 B2

APPARATUS FOR USE IN DIRECT RESISTANCE HEATING OF PLATINUM-CONTAINING VESSELS

FIELD

This invention relates to glass making and in particular to the direct resistance heating of platinum-containing vessels used to hold or transport molten glass, e.g., vessels such as melters, finers, stir chambers, formers, connecting tubes, and the like.

BACKGROUND

Platinum-containing materials, e.g., materials which contain at least 80 wt. % platinum, are widely used in the manufacture of glass and glass products because of their high melting temperatures, low levels of oxidation at elevated temperatures, resistance to corrosion by glass melts, and low levels of contamination of molten glass. Platinum-containing materials are also notoriously expensive. Accordingly, substantial reductions in capital costs can be achieved by even small reductions in the amount of platinum-containing materials used in a glass manufacturing facility.

Among the valuable characteristics of platinum-containing materials is their ability to generate heat when conducting electricity. As a result, molten glass flowing through, or held in, a platinum-containing vessel can be heated by passing electrical current between one or more locations along the length of the vessel's glass-contacting wall. Such heating is known in the art as "direct heating" or "direct resistance heating," the term used herein. In this usage, "direct" denotes heating from the vessel itself, rather than through externally applied indirect resistance heating.

A major challenge in direct resistance heating is the introduction and removal of the electric current from the vessel's wall. This is not only an electrical problem, but is also a thermal problem since the conduction path can lead to unbalanced current densities that create hot spots in the conduction path. These hot spots can lead to premature material failure, such as through accelerated oxidation of the metals involved or by reaching the melting point of the metal.

One way of introducing current into a vessel's wall is through the use of an electrically-conductive metal flange. Examples of such flanges can be found in U.S. Pat. Nos. 6,076,375 and 7,013,677. The present invention is concerned with flanges used to introduce current into a platinum-containing vessel wall and, in particular, ensuring a uniform current density within the flange and the vessel varying the molten glass.

SUMMARY

To improve the uniformity of the current density flowing through a flange designed to deliver electric current to a metal vessel for the purpose of heating a molten material flowing through the vessel, methods and apparatus are disclosed that provide for an angularly asymmetric mass distribution about the vessel. That is, a width of the flange, or portions, thereof varies from one angular position to another angular position. For example, the width of one portion of the flange at an angular position of 0 degrees (where the 0 degree radial position may be arbitrarily selected, but is preferably located on an axis of symmetry passing through an electrode supplying electric current to the flange) differs from the width of a similar flange portion located at an angular position of 180 degrees relative to the 0 degree position.

According to the embodiments disclosed herein, the flange is generally divided into rings joined in a series configuration so the rings are arranged one outside another as one moves outward from the vessel. The innermost ring of these nested rings is joined to the vessel to be heated. These rings represent the aforementioned flange portions.

In some embodiments reference may be made to portions of the flange being materially homogeneous. As used herein, materially homogeneous refers to the compositional makeup of one or more rings. For example, as described in more detail below, one or more rings may comprise platinum, either as a platinum alloy (e.g. a platinum-rhodium alloy), or pure platinum (e.g. greater than 99.8% platinum). In some embodiments, two or more rings may be substantially compositionally homogeneous (that is, compositionally homogeneous with only slight differences in composition due to the unintended presence of impurities) but still be dimensionally different (have different widths or thicknesses).

According to the embodiments disclosed herein, a more uniform current density through the flange, and ultimately at the vessel wall, can be achieved by varying the flange mass distribution about the vessel. That is, according to the embodiments disclosed here, current enters a flange through an electrode. Since the entire current flow first passes through this electrode when entering the flange, the current density in a conventional flange proximate the electrode is greater than other portions of the flange. This variation in current density can lead to hot spots occurring in the flange lifetime, and uneven heating of the vessel and the molten material flowing through the vessel. The asymmetric and varying mass distribution described herein works to more evenly distribute the current flow. To with, an asymmetry is introduced into the construction of the flanges used to heat the vessel.

In one embodiment an apparatus for heating a molten material is disclosed comprising a vessel having an electrically conductive exterior wall portion, an electrically conductive flange joined to the vessel about a circumference of the vessel, the flange comprising a plurality of rings including at least a first ring having a first composition and a second ring having a second composition different from the first composition, an electrode extending from the flange and wherein a width of at least one of the first or second rings varies as a function of angular position relative to the vessel. The first ring may, for example, comprise nickel. The second ring comprises a platinum group metal, and preferably comprises platinum or a platinum alloy.

In some embodiments the first ring is an outermost ring, and the width of the outermost ring, not including the electrode, varies as a function of angular position about the vessel. That is, as one moves about the ring in a clockwise or counterclockwise direction, the width of the outermost ring varies. For example, the width of the outermost ring at a location on an axis of symmetry bisecting the flange and proximate the electrode is greater than a width of the outermost ring at a location on the axis of symmetry farthest from the electrode. In some embodiments the second ring is an innermost ring joined to the vessel, and a width of the innermost ring is uniform as a function of angular position about the vessel. The width of the second ring may vary as a function of angular position about the vessel.

In some embodiments the first ring is an outermost ring and a width of the second ring varies as a function of angular position about the vessel. The second ring comprises a plurality of rings or be a singular ring, preferably of uniform thickness. In embodiments wherein the second ring comprises a plurality of rings, a width of each of the plurality of rings comprising the second ring varies as a function of angular position about the vessel.

In still other embodiments, a thickness of the first ring varies as a function of angular position about the first ring. The first ring may comprise a plurality of sections disposed about the vessel, the segments arranged and joined end-to-end, and a thickness of the plurality of sections varies as a function of angular position about the vessel. That is, the thickness of one section varies from the thickness of another section such that the overall thickness of the ring varies as one moves in a clockwise or counterclockwise direction around the ring. In some instances, each section of the plurality of sections has a uniform thickness. Preferably, the first ring is thicker at a first angular location relative to the vessel than at a second angular location displaced 180 degrees from the first angular location so that the ring is thickest near the electrode, and thinnest at a point on the ring farthest from the electrode. In some instances the second ring is a single ring and a thickness of the second ring varies as a function of angular position relative to the vessel. In other configurations the second ring comprises a plurality of rings, and for at least one ring of the plurality of rings comprising the second ring, a thickness of the at least one ring varies as a function of angular position relative to the vessel.

In yet another embodiment, the second ring comprises one or more rings, and a thickness of at least one of the one or more rings comprising the second ring varies as a function of angular position relative to the vessel. A thickness of the first ring may also vary as a function of angular position relative to the vessel.

In another embodiment, an apparatus for heating a molten material is disclosed comprising a vessel having an electrically conductive exterior wall portion, an electrically conductive flange comprising a plurality of rings including at least a first ring having a first composition and a second ring having a second composition different from the first composition, the second ring joined to the vessel about a circumference of the vessel, and wherein a width of at least one of the first or second rings varies as a function of angular position relative to the vessel. A thickness of at least one of the first or second rings may vary as a function of angular position relative to the vessel.

In still another embodiment, an apparatus for heating a molten material is disclosed comprising a vessel having an electrically conductive exterior wall portion, an electrically conductive flange comprising a plurality of rings including at least a first ring having a first composition and a second ring having a second composition different from the first composition, the second ring joined to the vessel about a circumference of the vessel, and wherein a thickness of at least one of the first or second rings varies as a function of angular position relative to the vessel. A width of at least one of the first or second rings may vary as a function of angular position relative to the vessel.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 3 is a front view of a flange which includes a platinum-containing ring, a nickel-containing ring, a nickel-containing cooling tube and an electrode.

FIG. 4 is a cross-sectional view of the flange of FIG. 3 illustrating an outer ring that is wider at one region than the width of the ring at a region at an angular position 180 degrees from the widest region.

FIG. 5 is a front view of another flange that includes a platinum-containing inner ring joined to the vessel, a nickel-containing outer ring, a nickel-containing cooling tube, and an electrode, wherein a width of the inner flange ring proximate the attached electrode is wider than a width of the inner ring at an angular position 180 degrees from the widest region.

FIG. 6 is a cross-sectional view of the flange of FIG. 5.

DETAILED DESCRIPTION

Figure 1:
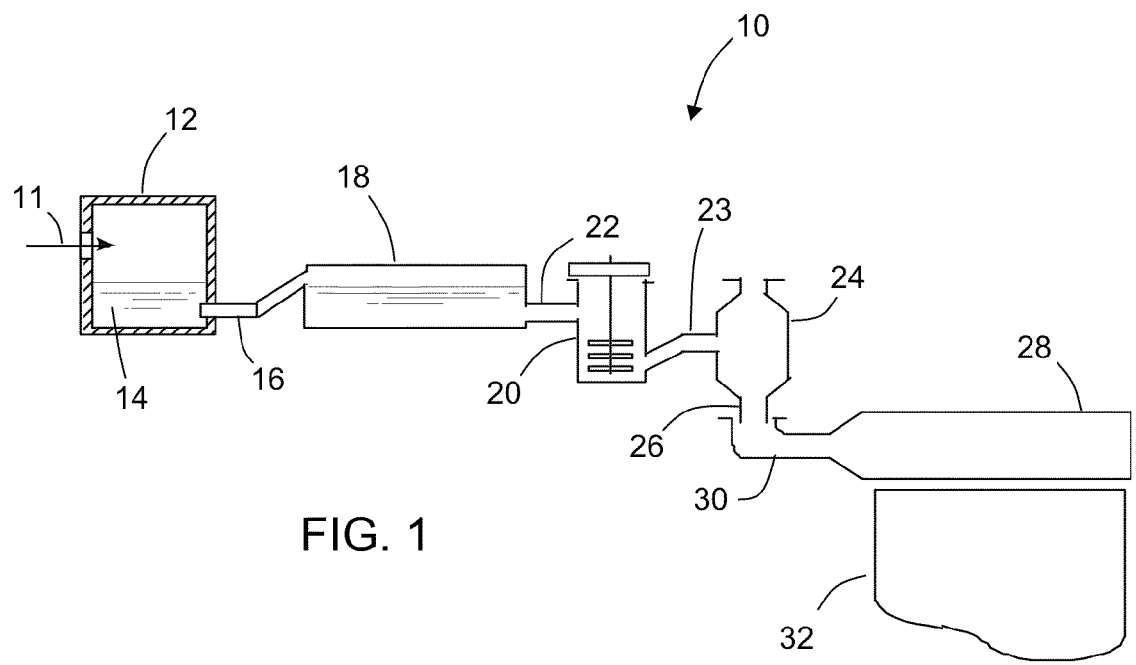
FIG. 1 is a schematic drawing illustrating an exemplary glass making process comprising conducting metallic vessels for holding and/or conveying molten glass.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

In the exemplary apparatus 10 of FIG. 1, batch materials, represented by arrow 11 are melted in a furnace or melter 12 to form molten glass 14 at a first temperature $T_1$. $T_1$ is dependent on the particular glass composition, but for LCD-capable glasses $T_1$ can be in excess of 1500° C. The molten glass flows from melter 12 through connecting tube 16 to finer tube (or "finer") 18. From finer 18 the glass flows to stirring vessel 20 through connecting tube 22 to be mixed and homogenized, and from stirring vessel 20 through connecting tube 23 to bowl 24 and thereafter downcomer 26. The molten glass can then be directed to forming body 28 through inlet 30. In the case of the fusion downdraw process depicted in FIG. 1, the molten glass delivered to forming body 28 flows over converging forming surfaces of forming body 28, where the separate flows are joined together, or fused, to form ribbon of glass 32. The ribbon may then be cooled and separated to form individual glass sheets.

At finer 18 the molten glass is heated to a second temperature $T_2$ higher than $T_1$. For example, whereas $T_1$ may be 1500° C., $T_2$ can be at least 100° C. greater than $T_1$. The relatively high temperature in $T_2$ reduces the viscosity of the molten glass, thereby allowing bubbles in the molten material to more easily be eliminated. Moreover, the higher temperature releases oxygen contained in fining agents (e.g., multivalent oxide materials) that entered the glass through the batch materials. The released oxygen forms bubbles in the molten glass that serve essentially as nucleating sites. To wit, dissolved gasses in the molten glass migrate into the oxygen bubbles, growing the bubbles. The increased buoyancy resulting from the bubble growth speeds removal of the bubbles from the molten glass through a free surface.

While melter 12 is typically formed from a refractory material (e.g. ceramic bricks), much of the downstream system, including various vessels for conveying the molten glass, such as connecting tubes 16, 22, 23, finer 18, stirring vessel 20, bowl 24 and downcomer 26 are all typically formed from an electrically conducting metal, usually platinum or a platinum alloy such as a platinum rhodium alloy. As described above, the molten glass is quite hot, and therefore a high temperature material capable of withstanding temperatures in excess of at least 1600° C. for prolonged periods is needed. Moreover, the material should be resistant to oxidation, which can be accelerated by the high temperature. In addition, the molten glass is fairly corrosive, so the material should be relatively resistant to attack from the glass that can result in contamination of the glass by the vessel material. Metals comprising the periodic table platinum group (platinum, rhodium, iridium, palladium, ruthenium and osmium) are particularly useful for this purpose, and because platinum is more easily worked than other platinum group metals, many high temperature processes utilize platinum or platinum alloy vessels. However, because platinum is expensive, every effort is made to minimize the size of these vessels. One example relates to melter-to-finer connecting tube 16.

In an unheated transfer between the melter and the finer (that is, where heat energy is not added to the molten glass material after melter 12), the molten glass begins immediately to cool upon entering connecting tube 16 from melter 12. However, to extract the greatest efficiency from the fining process, the molten glass should be at the fining temperature ($T_2$) as the glass enters the finer. Thus, connecting tube 16 is preferably heated to prevent cooling of the glass in the connecting tube, and in fact to increase the temperature of the molten glass to the fining temperature before the glass enters the finer. This heating is usually accomplished by a direct heating method as summarized earlier, although external heat sources can be used. If the flow of molten glass is increased, the heating requirements are increased. That is, the length of the finer must be increased to ensure the molten glass contained in the finer is at the proper temperature for the proper amount of time for the fining operation, or the length of connecting tube 16 is increased to ensure the molten glass is at the proper temperature before entering the finer. In either case, process costs increase as the amount of platinum used increases. Moreover, in a typical manufacturing environment the availability of additional floor space is often limited, rendering the option of lengthening components problematic, regardless of material costs.

An alternative approach is to increase the heat energy supplied to the connecting tube. For a direct heated connecting tube this means increasing the electrical current flow through the directly heated component. The current can be an alternating current (AC) or a direct current (DC), but is often an AC current. However, the increased current flow has been found to create hot spots both at the point where the conducting flange that feeds electric current to the vessel meets the vessel wall and within the flange itself. Hot spots at the flange-vessel joint can lead to uneven heating of the molten glass and poor fining performance, and hot spots within the flange can compromise the integrity of the flange, such as by inducing accelerated oxidation or melting, and premature failure of the flange. Moreover, although electrical flanges may be actively cooled to prevent premature failure, failure of the cooling system can be catastrophic if the un-cooled temperature of the flange exceeds a certain threshold for the material used.

One cause of hot spots in a flange results from the high current density in the flange at a location on a line with the electrode that connects the flange to the electrical current source. That is, flanges typically include a tab or electrode that extends from the flange and connects to cables or bus bars that feed current to the flange. As a result, the electric current density near the location where the electrode joins with the flange is typically much higher than other locations on the flange. If the current supplied to the flange is increased to address greater heating demands, the higher current density in the flange in the region near the electrode (where the current is distributed to the flange from the electrode) can create a temperature great enough in the flange to cause premature failure of the flange through rapid oxidation of the materials comprising the flange. Or, in extreme cases, the current flow may be sufficient to heat and melt the electrode and/or flange.

Figure 2:
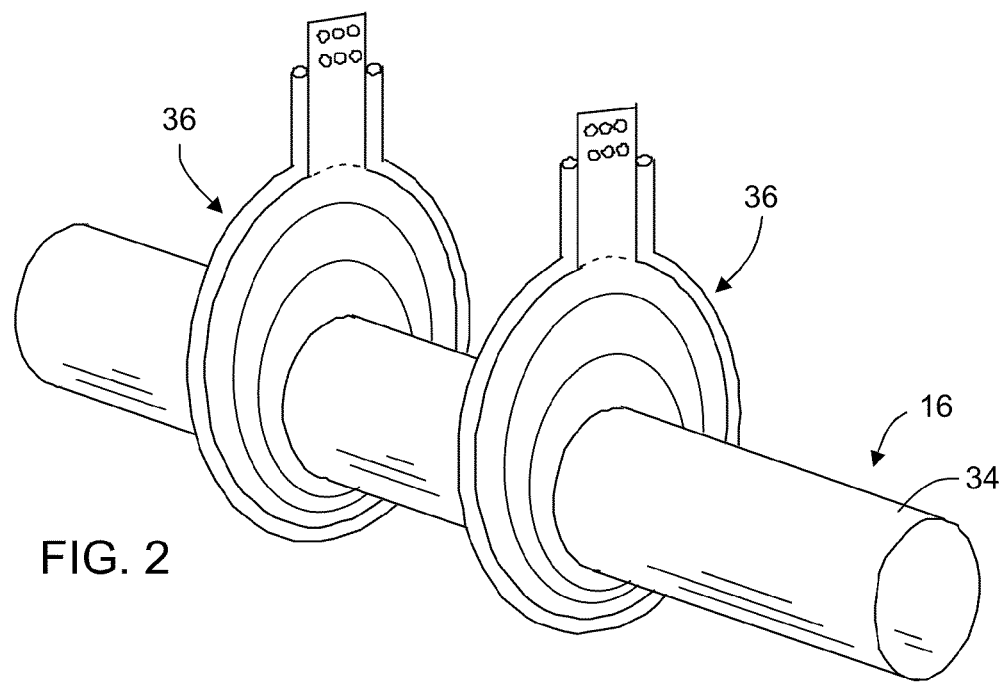
FIG. 2 is a perspective drawing showing the use of current-carrying flanges to heat the exterior wall of a glass-carrying vessel of FIG. 1.

FIG. 2 illustrates a portion of a direct resistance heating system and depicts an exemplary metal vessel (e.g. tube), here melter-to-finer connecting tube 16, having an exterior wall 34 to which are attached two flanges 36 that apply electric current to exterior wall 34. It should be noted that tube 16 represents an exemplary use of direct heating, and flanges 36 could be employed with any other electrically conducting metal vessels utilized to hold or convey molten glass, such as finer 18.

Although only two flanges are shown, in practice more than two flanges can be used for any particular vessel to provide electric current to different sections of the vessel's exterior wall. In addition, only a single electrode per flange is illustrated, although flanges having multiple electrodes may also benefit from embodiments described herein. Finally, although the exterior wall in FIG. 2 is depicted having a circular shape, the wall can have a variety of other shapes, such as elliptical, oval, square, rectangular, and the like. The central aperture of the flange through which the vessel extends will then have a complimentary shape.

In accordance with FIG. 2, a current is supplied to a first flange. The current travels through the first flange, enters the vessel wall, and is withdrawn through the second flange spaced apart from the first flange. The distance between the flanges is determined by the heating requirements placed on the vessel, and is easily determined by one of ordinary skill in the art. The electric current traveling through the wall of the tube heats the tube and the molten glass conveyed within. Although not shown in FIG. 2, during use, the vessel's wall and the flanges will normally be surrounded by thick layers of insulating refractory materials to control heat loss from the vessel.

FIG. 3 shows the construction of an embodiment of a single flange 36 of FIG. 2 in more detail. As can be seen, flange 36 includes two rings 38, 40, wherein the innermost ring 38 is formed from a high-temperature resistant metal (i.e., as used herein, a metal capable of operating at temperatures above at least 1400° C., preferably at least 1500° C. and more preferably at least 1600° C.) that comprises at least 80 wt. % platinum, with the remainder, if any, being one or more of: rhodium or iridium. As one example, innermost ring 38 can comprise 90 wt. % platinum and 10 wt. % rhodium.

Because the temperature of flange 36 decreases as a function of increasing radial position from the molten glass-conveying tube, the temperature resistance required from the outermost ring material is not as high as that required from the innermost ring material. Thus, to save cost, outermost ring 40 is made of a material generally having a high melting temperature, but being considerably less expensive than the platinum containing material of the flange inner ring. In accordance with certain embodiments, outermost ring 40 of flange 36 is formed from commercially pure nickel (e.g. at least 99.0 wt. % nickel), such as nickel 200 or nickel 201, which is readily available at low cost compared to platinum and platinum alloys. When used in an electrical power flange, nickel provides an excellent combination of electrical resistance, thermal conductivity, oxidation resistance, solubility with platinum and rhodium, machinability, price, and availability in many forms and shapes, which other high temperature materials cannot match.

As shown in FIG. 4 illustrating a cross sectional view of the flange of FIG. 3, rings 38 and 40 have different thicknesses, $t_{38}$ and $t_{40}$, respectively. These thicknesses are chosen to control the current density as a function of radial position. That is, the thickness of the flange varies as one moves in a radial direction from the vessel outward. A number of considerations come into play in selecting these thicknesses. First, as discussed above, the primary goal of direct resistance heating is to heat the molten glass in vessel 16, not to heat the flanges supplying electric current to the vessel's wall. Accordingly, the electric current density in the flange should be less than the current density in the vessel wall to minimize energy loss. Second, the electric current density should be controlled so that parts of the flange do not become overheated and thereby damaged. This is particularly a problem for those portions of the flange that experience higher ambient temperatures during use.

As a starting point for selecting ring thicknesses, it can be noted that a circular flange constructed of a single material having a constant thickness will have a current density that increases linearly with decreasing radius, i.e., the current density will be the smallest at the outer edge of the flange and the greatest at the inner edge. To offset this effect, the thickness of the flange should be increased as the radius becomes smaller. In terms of temperature, the ambient temperature normally drops as one moves outward from vessel 16 and thus electric current density can be higher towards the outside of the flange where the chances of damage due to overheating are less. This leads to a flange whose thickness becomes smaller as the radius increases. A reduced thickness in the outer region of the flange is also desirable in terms of minimizing the amount of material used to construct the flange, especially in the case of expensive platinum-containing materials.

A further factor involves the resistivity of the material making up the flange, especially where more than one type of material is being used. The higher the resistivity, the greater the direct heating effect for the same current density. Also, it can be desirable for the outermost ring of the flange to have a substantial thickness so that the ring has a low resistance to circumferential current flow. More particularly, in certain embodiments, the variation in calculated radial current density (i.e., the modeled current density variation) around the circumference of the outermost ring is less than 50%.

In addition to these electrical considerations, the effects of operating temperature on the nickel-containing components of the flange also need to be considered. In general terms, suitable temperatures for the nickel-containing components of the flange are: (1) less than about 600° C. in normal operation with water cooling, (2) less than about 800° C. with air cooling, and (3) less than about 1000° C. un-cooled. At about 600° C. and below, nickel has a sufficiently low oxidation rate so that flange lifetimes of three years or more can be achieved. At about 1000° C., the usable lifetime is less than 30 days. The lifetime at about 800° C. is between these values, and may be acceptable for some applications, especially if exposing the nickel to these temperatures allows air cooling to be used which can often be less complex than water cooling.

More generally, temperatures decrease in the refractory insulation as the radial position from the axis of the glass-containing vessel is increased. Temperatures likewise decrease with increasing radius of the flange. At some radial position on the flange, the temperature drops below about 1000° C. Beyond this radial position, nickel can safely be used for the flange material. If the nickel temperature limits, e.g., about 600° C. for long life, about 800° C. for intermediate life, or about 1000° C. for short periods of time, are exceeded under any condition, the joint between nickel and the high-temperature metal used in the inner part of the flange must be moved to a larger radius. Outward movement of the joint, of course, should be balanced against increased material costs since the high-temperature, and thus, high cost metal must then extend to a larger radius.

In practice, computer modeling will typically be used to take into account the various factors involved in selecting the radii and thicknesses of the rings making up the flange. Such modeling can be performed using commercially available or customized software packages that calculate electric current flows for specified conductor properties and geometries, as well as packages that model heat flows and calculate temperature distributions for specified material properties and heat source/sink locations. For example, using such analyses a suitable relationship for the thicknesses (t's) of the rings of FIG. 4 was found to be: $t_{40} > t_{38}$ where inner ring 38 was made of 90 wt. % platinum and 10 wt. % rhodium, and outer ring 40 as well as electrode 42 and cooling tube 44, were made of nickel 200/201. Other relationships can, of course, be used, the specific relationship which is suitable for any particular application being readily determined by persons skilled in the art from the present disclosure.

The rings and the electrode used to construct the flange will typically be fabricated from flat metal sheets, e.g., nickel 200 or nickel 201 sheets for electrode 42 and outer ring 40, and a platinum-rhodium alloy sheet (e.g., 90 wt. % platinum and 10 wt. % rhodium) for inner ring 38. The joints between the rings are typically welded. The welds can be filleted to avoid re-entrant corners which can produce a locally high current density that can cause a joint to overheat and fail. Innermost ring 38 is joined to outer wall 34 of vessel 16, usually by welding. Again, filleting can be used to avoid re-entrant corners. The thickness of innermost ring 38 is typically greater than the thickness of the vessel's wall 34, although other thicknesses can be used for the innermost ring if desired, e.g., the thickness of the innermost ring can be equal to or smaller than the thickness of wall 34.

In addition to rings 38 and 40, the flange of FIGS. 3 and 4 includes cooling channel 44 in the form of a tube, preferably made of the same material as outer ring 40, although the cooling tube can be made from a different material. In certain embodiments, cooling tube 44 comprises at least 99.0 wt. % nickel. The cooling tube is electrically connected to a current source (not shown) and the cooling tube is joined to outermost ring 40, typically about a periphery of outermost ring 40. However, in some embodiments the cooling channel can be formed in outermost ring 40, e.g., the cooling channel can be machined into the outermost ring. The cooling fluid that can be a liquid, e.g., water, or a gas, e.g., air, is circulated through the cooling channel to keep the tube (and the flange to which it is connected) at temperatures below those at which it will rapidly oxidize and/or melt. Substantial cooling may be required to prevent rapid oxidation of the flange as the temperature of the molten glass in vessel 16 can be in excess of 1600° C.

In addition to its cooling function, cooling tube 44 may also function as a bus bar to distribute current around the periphery of outermost ring 40.

The use of nickel for the above components of a power flange has been found to significantly improve the ability of the flange to withstand temporary stoppages in the flow of cooling water. In particular, the flange exhibits a high level of oxidation resistance so that if cooling fluid flow is interrupted, the flange will remain operable for up to several days. The superior oxidation resistance of a nickel-containing flange provides sufficient time to restore coolant flow without loss of the platinum part and thus without the need to interrupt the flow of glass through the vessel.

In addition to its ability to withstand temporary interruptions in coolant flow, nickel-containing flanges also require less cooling than, for example, copper-containing flanges often used in lower temperature systems. Accordingly, in general, less direct resistance heating is needed when a nickel-containing flange is used. This reduction in direct resistance heating, in turn, reduces operational costs for electricity and capital costs in terms of the capacity of the electrical source needed to power the direct heating system.

In addition to these functional benefits, the use of one or more rings which comprise nickel significantly reduces the cost of the flange since the nickel is used at locations where platinum or a platinum alloy might otherwise be used in a copper-containing flange. That is, the lower temperature resistance of copper means a platinum-copper flange requires the platinum to extend farther to provide a safe operating environment for the copper. Although the prices of nickel and platinum vary over time, as a rule of thumb, platinum is at least 400 times more expensive than nickel and sometimes can be more than 1800 times more expensive.

As depicted in the embodiment of FIGS. 3 and 4, the connecting tube (vessel) 16 is not positioned concentrically relative to outermost ring 40, in this instance a nickel containing ring. As shown, inner platinum-containing ring 38 is disposed concentrically about connecting tube 16 and joined about a circumference thereof. In accordance with FIG. 3, dashed line 46 represents an axis of symmetry passing through electrode 42 and bisecting flange 36. In a typical installed flange orientation, axis of symmetry 46 represents a vertical axis. However axis of symmetry 46 need not be vertical. As illustrated, an overall width W1 of outermost ring 40 proximate electrode 42 is wider than an overall width W2 of outermost ring 40 on the opposite side of connecting tube 16, i.e. where W2 is the width displaced angularly 180 degrees from width W1. That is, W1 shown in FIGS. 3 and 4 is wider that W2. Note that W1 does not include electrode 41. FIG. 4 shows a cross sectional view of the flange of FIG. 3 depicting the increased width of the portion of outermost ring 40 proximate electrode 42 compared to the width of outermost ring 40 opposite electrode 42 (i.e. displaced angularly by 180 degrees).

It should be noted that outermost electrode 40 may itself comprise multiple rings in some embodiments. For example, outermost ring 40 may be a nickel-containing ring comprised of a plurality of nickel-containing rings of different thicknesses. The nickel may be alloyed with other metals, such as platinum for example.

FIGS. 5 and 6 depict another embodiment wherein inner platinum-containing ring 38 is offset relative to connecting tube 16, and a width W3 of the platinum-containing ring 38 proximate electrode 42 as measured along axis of symmetry 46 is wider than width W4 of platinum-containing ring 38 located 180 degrees from W3. In this embodiment, nickel-containing ring 40 has a width that is substantially uniform.

Figure 7:
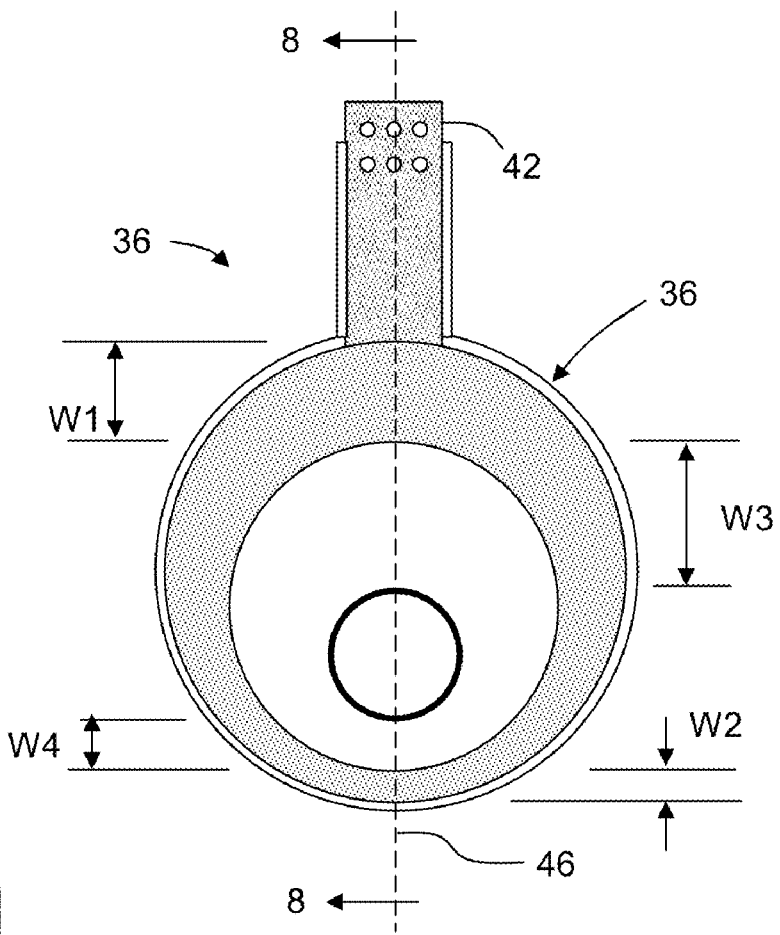
FIG. 7 is a front view of another flange that includes a platinum-containing ring, a nickel-containing ring, a nickel-containing cooling tube and an electrode wherein both the inner ring and the outer ring are offset from the vessel (i.e. non-concentric with the vessel).
Figure 8:
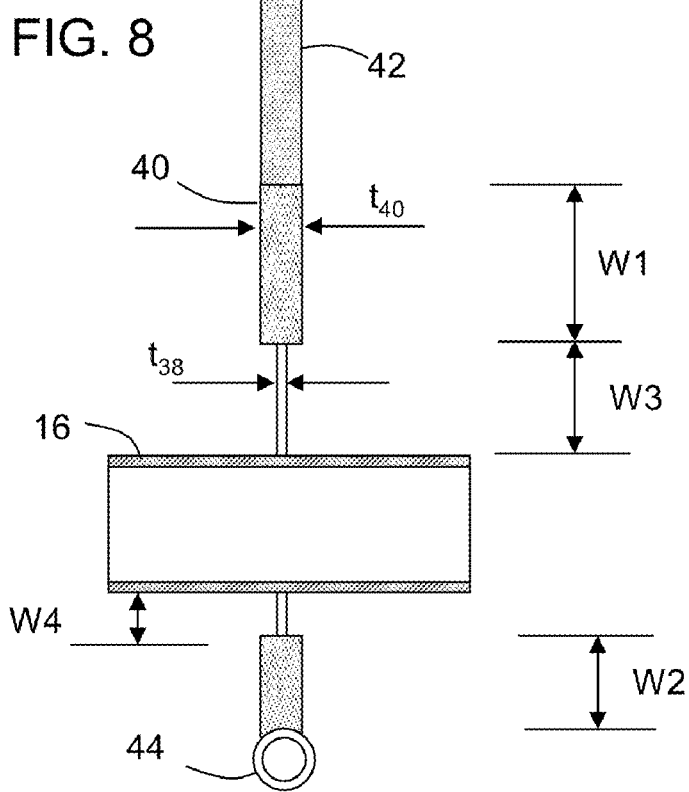
FIG. 8 is a cross sectional view of the flange of FIG. 7 showing the variation of thickness of the flange rings as a function of radius from the vessel.

In another embodiment shown in FIGS. 7 and 8, connecting tube 16 is not positioned concentrically within platinum-containing ring 38. That is, width W3 between the outside perimeter of the platinum-containing ring 38 and external wall 34 of connecting tube 16 along axis of symmetry 46 is greater than the width W4 of platinum-containing ring 38 between wall 34 and the outside perimeter of ring 38. More simply put, the width of the platinum-containing ring 38 varies as one travels around the ring (i.e. at different angular positions around the ring). The largest width according to the embodiment is directly proximate the electrode that supplies current to the flange (i.e. on axis of symmetry 46 proximate electrode 42). Having a first width of the platinum containing portion of the flange near the electrode larger than a second width of the platinum-containing flange and positioned 180 degrees from the first width moves the wall of the connecting tube further from the current flow coming from the electrode. Thus, the amount of material traversed by the current is made larger where the current density is highest. Conversely, the amount of platinum-containing material traversed by the current is made smaller where the current density is lowest. The result is an increased uniformity of current flow through platinum containing ring 38 and thus into connecting tube 16.

In addition to the offset of platinum-containing ring 38, nickel-containing outermost ring 40 is also offset. That is, with W1 of nickel-containing ring 40 is greater than width W2, and width W3 of platinum-containing ring 38 is wider than width W4 so that both nickel-containing ring 40 and platinum-containing ring 38 are width proximate electrode 42 than they are directly opposite at the other side of connecting tube 16.

Figure 9:
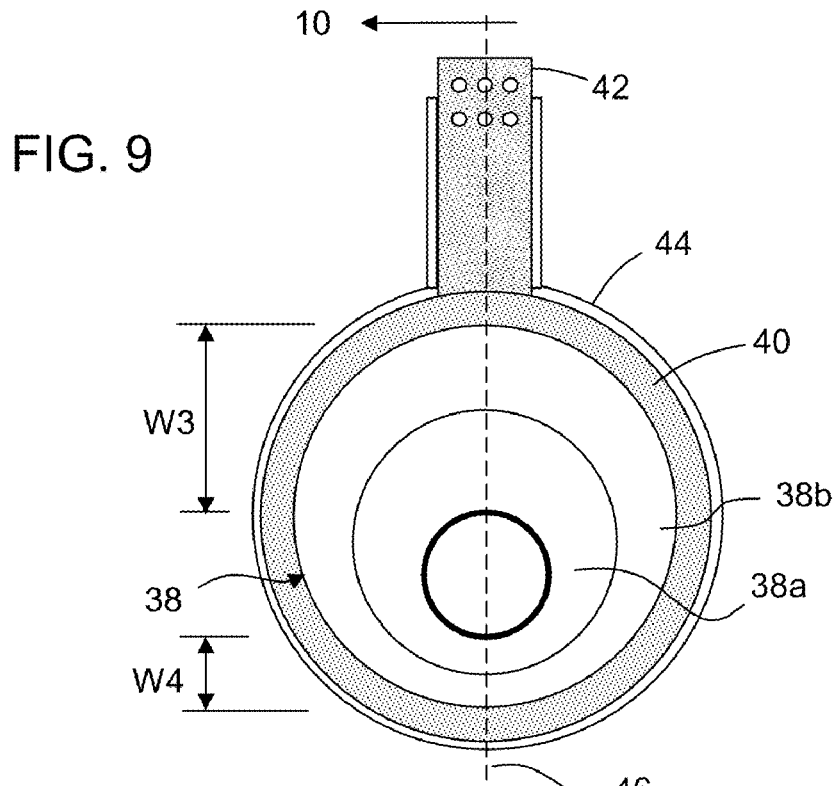
FIG. 9 is a front view of another flange that includes a platinum-containing ring, a nickel-containing ring, a nickel-containing cooling tube and an electrode wherein the platinum containing ring comprises a plurality of rings of different thicknesses, and wherein platinum-containing rings of the plurality of platinum-containing rings are offset relative to the vessel (wherein the ring widths vary as a function of angular position about the vessel).
Figure 10:
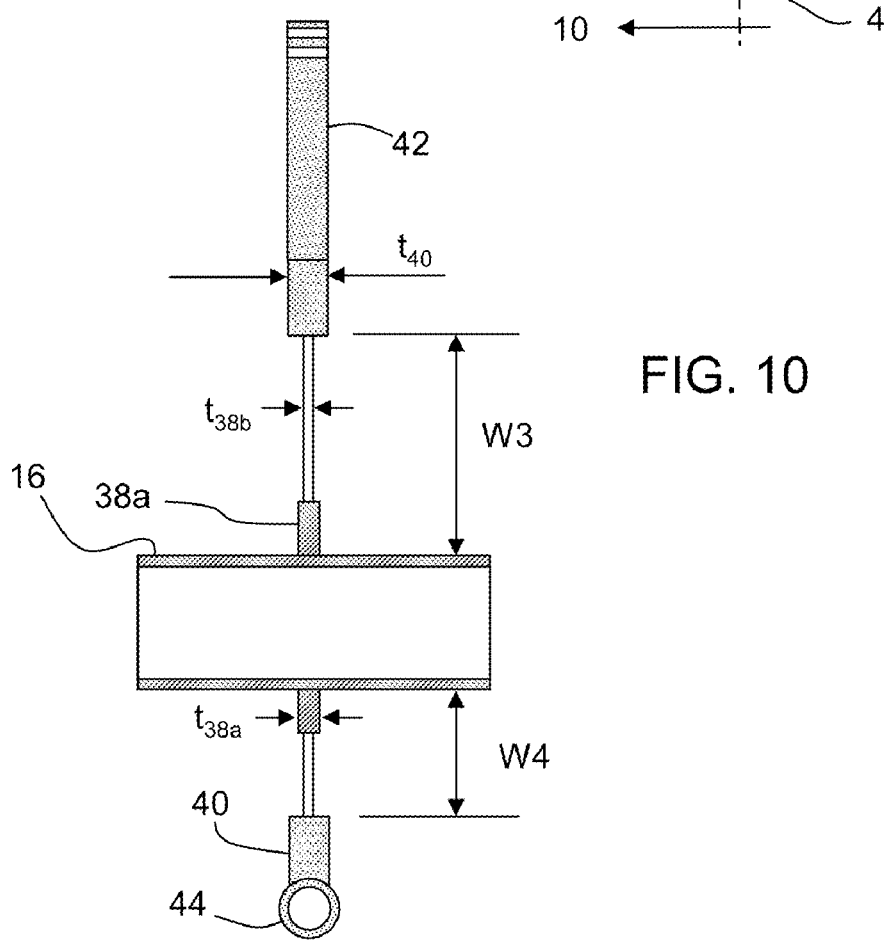
FIG. 10 is a cross sectional view of the flange of FIG. 9 showing the variation of ring thickness as a function of radial position.

FIGS. 9 and 10 show still another embodiment comprising a nickel-containing ring 40, but where platinum containing ring 38 comprises two platinum-containing rings 38a and 38b disposed about connecting tube 16, wherein the innermost platinum-containing ring 38a is joined to connecting tube 16, such as by welding. However, the overall width W3 of platinum-containing ring 38 along axis of symmetry 46 through electrode 42 between outermost ring 40 and wall 34 of connecting tube 16 is greater than the overall width W4 along axis 46 located 180 degrees from W3.

In addition, the thickness $t_{38a}$ of innermost platinum-containing ring 38a is greater than thickness $t_{38b}$ of first intermediate platinum-containing ring 38b. Preferably, thickness $t_{40}$ of outermost ring 40 (e.g. nickel-containing ring 40) is greater than thickness $t_{38a}$ of innermost platinum-containing ring 38a and greater than thickness $t_{38b}$ of first intermediate platinum-containing ring 38b such that $t_{40} > t_{38a} > t_{38b}$. Preferably, each platinum-containing ring 38a and/or 38b may be offset, or innermost platinum containing ring 38a may be concentric with connecting tube 16 and only first intermediate platinum-containing ring 38b offset. It should be noted that outer ring 40 may be offset as previously described, or not.

Figure 11:
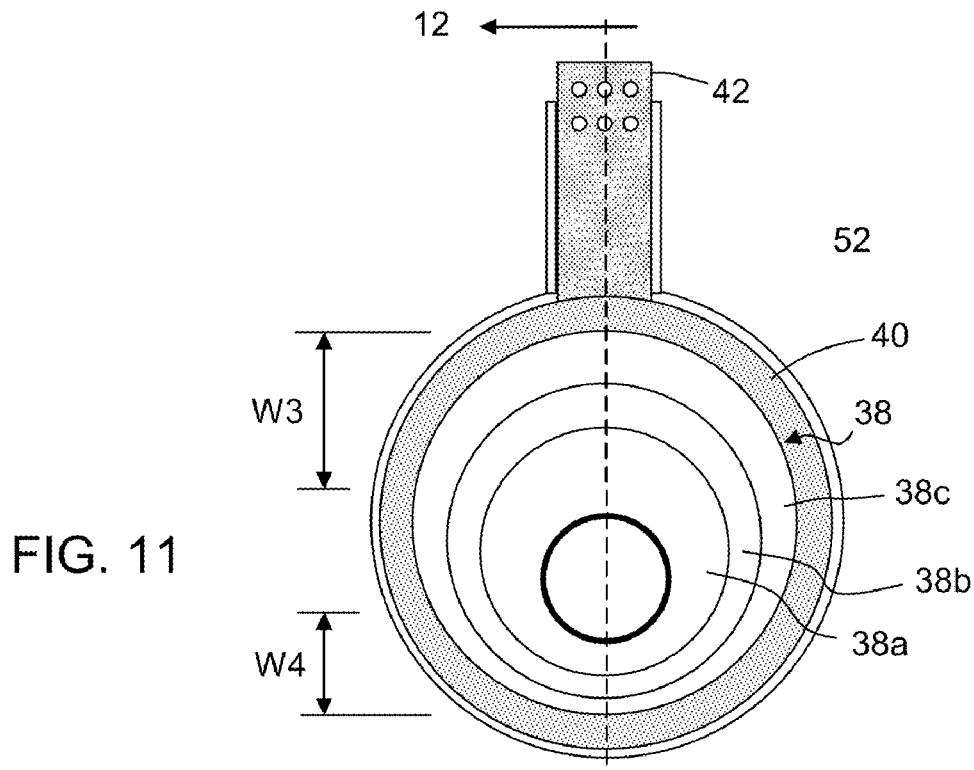
FIG. 11 is a front view of another flange that includes a platinum-containing ring, a nickel-containing ring, a nickel-containing cooling tube and an electrode wherein the platinum containing ring comprises a plurality of rings of different thicknesses, and wherein platinum-containing rings of the plurality of platinum-containing rings are offset relative to the vessel (wherein the ring widths vary as a function of angular position about the vessel).
Figure 12:
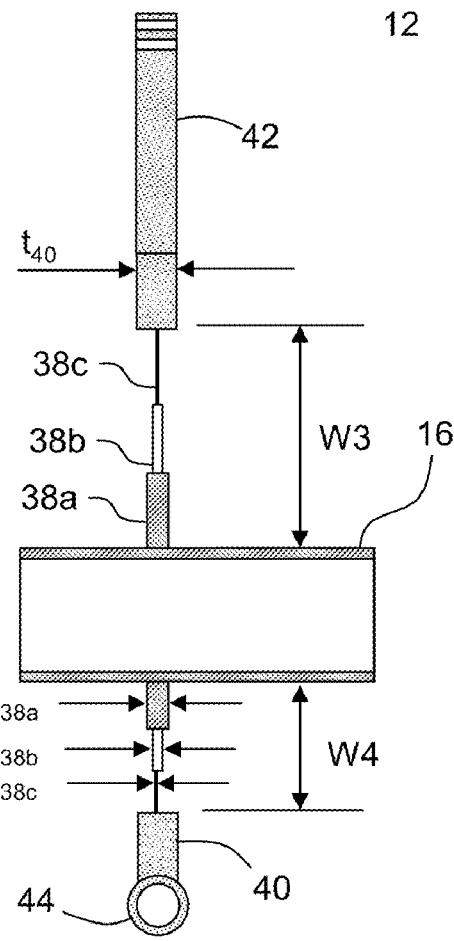
FIG. 12 is a cross sectional view of the flange of FIG. 11 showing the variation of ring thickness as a function of radial position.

FIGS. 11 and 12 show yet another embodiment wherein platinum-containing ring 38 comprises three platinum-containing rings 38a, 38b and 38c disposed about connecting tube 16, wherein the innermost platinum-containing ring 38a is joined to connecting tube 16, such as by welding. A first intermediate platinum-containing ring 38b is disposed about innermost platinum-containing ring 38a and joined to a perimeter thereof, and a second intermediate platinum-containing ring 38c is disposed about second intermediate platinum-containing ring 38b and joined to a perimeter thereof. The overall width W3 of platinum-containing ring 38 along axis of symmetry 46 through electrode 42 between outermost ring 40 and wall 34 of connecting tube 16 is greater than the overall width W4 of platinum-containing ring 38 along axis 46 located 180 degrees from W3. In addition, the thickness $t_{40}$ of outermost ring 40 is greater that $t_{38a}$ of innermost platinum-containing ring 38a, thickness $t_{38a}$ is greater than thickness $t_{38b}$ of first intermediate platinum-containing ring 38b, and the thickness $t_{38b}$ of first intermediate platinum-containing ring 38b is greater than the thickness $t_{38c}$, of second intermediate platinum-containing ring 38c, such that $t_{40} > t_{38a} > t_{38b} > t_{38c}$. Each individual ring is assumed to have a uniform thickness. Each individual platinum-containing ring 38a-38c may be offset relative to connecting tube 16. Alternatively, innermost platinum-containing ring 38a may be concentric with connecting tube 16 (i.e. have a uniform width), with first and second intermediate platinum-containing rings 38b and 38c being offset relative to connecting tube 16.

It should be apparent based on the teaching of the present disclosure that a plurality of individual platinum-containing rings may be employed to provide a radially increasing thickness of the platinum-containing portion of the flange as a function of decreasing radius. However, a common feature of the preceding embodiments is a variable overall width of the platinum-containing portion of the flange and/or a variable overall width of the outermost (e.g. nickel-containing) ring relative to angular position around the vessel (e.g. connecting tube) about which the flange is disposed, with the exception that the widths of the platinum containing-portion of the flange along an axis perpendicular to axis 46 may be identical for a flange that is symmetric about axis 46. The use of a varying width of the platinum-containing ring or rings as one moves angularly around the flange provides for a platinum-containing material mass gradient that works to make the current density more uniform at the connecting tube/flange joint and within the flange itself.

Figure 13:
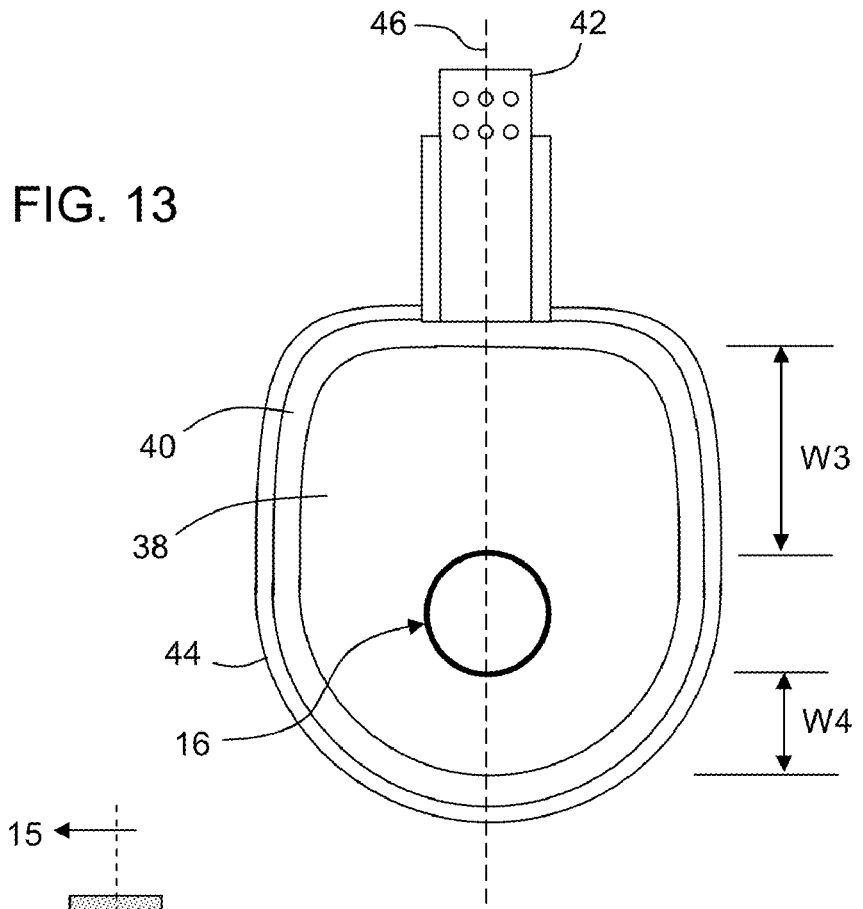
FIG. 13 is a front view of another flange having non-circular rings (e.g. a non-circular outermost ring and a non-circular platinum-containing ring).

The embodiment of FIG. 13 illustrates a more general embodiment of a flange having other than substantially circular ring perimeters depicted in the preceding embodiments. Still, the flange of FIG. 13, axis of symmetry 46 passing through electrode 42 bisects the flange and either the overall width of the platinum-containing ring 38 proximate electrode 42 and/or the width of outermost ring 40 proximate electrode 42, are greater than the widths of those portions of the respective rings located on the opposite side of connecting tube 16.

Figure 14:
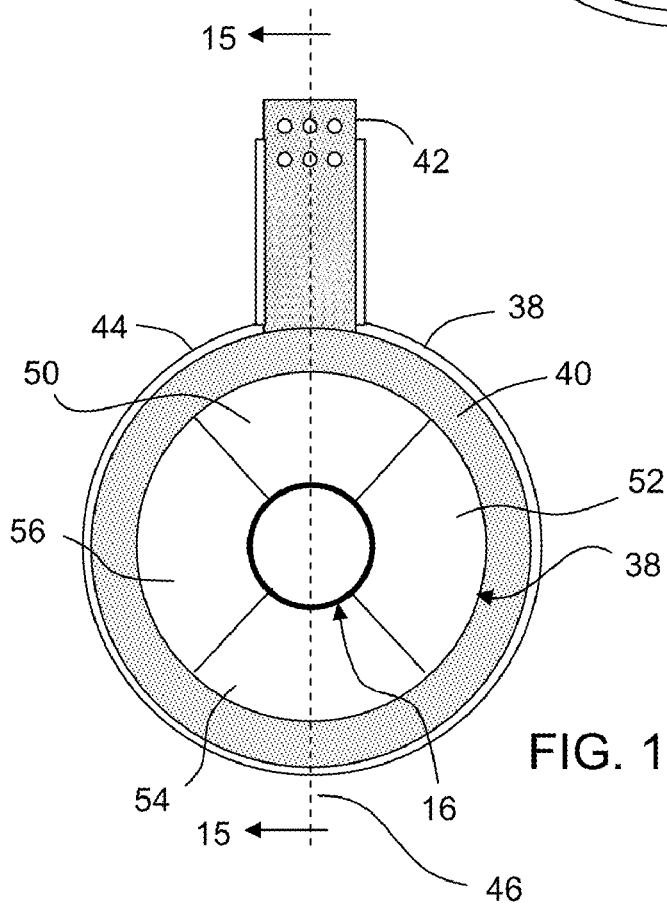
FIG. 14 is another flange wherein the platinum-containing inner ring is divided into segments and a segment thickness is a function of angular position.
Figure 15:
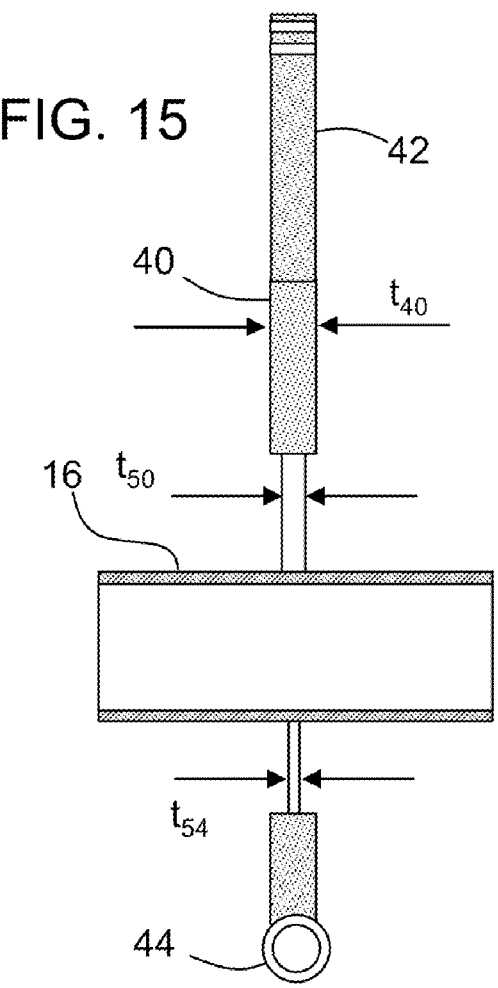
FIG. 15 is a cross sectional view of the flange of FIG. 14 showing the different thicknesses of the platinum-containing ring as a function of angular position.

In yet another embodiment shown in FIGS. 14-15, the thickness of platinum-containing ring 38 varies as a function of angular position about connecting tube 16. For example, FIG. 14 depicts a flange 36 having a singular platinum-containing ring 38 shown divided into four segments 50, 52, 54 and 56 arranged at a 12:00 o'clock position, a 3:00 o'clock position, a 6:00 o'clock position and a 9:00 o'clock position respectively, moving in a clockwise direction. According to the present embodiment, segment 50 at the 12:00 o'clock position is made thicker than segment 54 at the 6:00 o'clock position. Segments 52 and 56 at the 3:00 o'clock and 9:00 o'clock positions, respectively, have a thickness intermediate between the 12:00 o'clock and 6:00 o'clock segments 50 and 54. The thicknesses of segments 52 and 56 may be equal, for example. Thus, as one moves in a clockwise direction from the 12:00 o'clock position around ring 38, the ring thickness $t_{38}$ gets thinner, reaching a minimum thickness at the 6:00 o'clock position and then gets thicker toward the 12:00 o'clock position again. Of course, if platinum-containing ring 38 includes a plurality of rings (e.g. rings 38a, 38b . . . as previously described), they may vary in thickness as a function of angular position. Additionally, outermost ring 40 may be similarly segmented with segments of varying thickness. The variation in thickness as a function of angular position can be step-wise (such as by welding sections—wedges—of varying thickness together) as described above, or gradual (continuous), depending on machining capability. A step-wise change in thickness is typically easier to produce, wherein individual segments are arranged together and welded.

In some embodiments, one or both of the outermost ring and the platinum containing ring may be offset relative to connecting tube 16, and also include rings (the outermost ring, the platinum-containing ring or rings, or both the outermost ring and the platinum-containing rings) having a varying thickness as a function of angular position ad described supra.

As previously noted, although flange 36 has been described in reference to connecting tube 16, the flanges described herein may be employed on other electrically conductive vessel where direct resistance heating is applied to heat a material flowing within the vessel.

Figure 16:
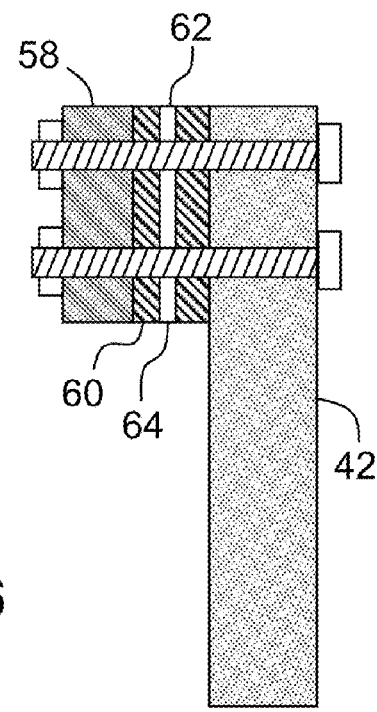
FIG. 16 is a cross sectional side view of a flange electrode according to embodiments of the present invention showing a cooling block disposed between the electrode and a bus bar supplying electric current to the flange.

It should be noted that in each of the preceding embodiments, various configurations of the cooling tubes and/or passages can be employed. For example, a cooling tube 44 for electrode 42 may be segregated a cooling tube 44 for the flange (i.e. at outermost ring 40), so that the electrode can be cooled separately from the remainder of the flange. The extent to which this may be necessary depends on the specific requirements of the flange and vessel, e.g. temperature, current, etc. In some instances, cooling of the outermost ring may not be required if the temperature of the ring is sufficiently low, and only the electrode provided with cooling tube 44 (or simply not have a cooling fluid flowing through the outermost ring portion of the cooling tube. In some embodiments, cooling for either the outermost flange or the electrode may not be required. In still other embodiments, the junction between electrode 42 and a bus bar 58 that supplies current to the electrode may include cooling block 60 as illustrated in FIG. 16. FIG. 16 depicts a portion of electrode 42, bus bar 58 and cooling block 60, and shows inlet 62 and outlet 64 for supplying a cooling fluid to passages within the interior of cooling block 60. Of course, as an alternative, a cooling tube can be attached to an exterior of cooling bock 60.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for heating a molten material comprising:
    a vessel having an electrically conductive exterior wall portion;
    an electrically conductive flange joined to the vessel about a circumference of the vessel, the flange comprising a plurality of rings including at least a first ring having a first composition and a second ring having a second composition different from the first composition;
    an electrode extending from the flange; and
    wherein a width of at least one of the first or second rings varies as a function of angular position relative to the vessel.

2. The apparatus according to claim 1, wherein the first ring comprises nickel.

3. The apparatus according to claim 1, wherein the second ring comprises platinum.

4. The apparatus according to claim 1, wherein the first ring is an outermost ring, and the width of the outermost ring, not including the electrode, varies as a function of angular position about the vessel.

5. The apparatus according to claim 4, wherein the width of the outermost ring at a location on an axis of symmetry bisecting the flange and proximate the electrode is greater than a width of the outermost ring at a location on the axis of symmetry farthest from the electrode.

6. The apparatus according to claim 4, wherein the second ring is an innermost ring and a width of the innermost ring is uniform as a function of angular position about the vessel.

7. The apparatus according to claim 4 wherein a width of the second ring varies as a function of angular position about the vessel.

8. The apparatus according to claim 1, wherein the first ring is an outermost ring and a width of the second ring varies as a function of angular position.

9. The apparatus according to claim 8, wherein the second ring comprises a plurality of rings.

10. The apparatus according to claim 9, wherein a width of each of the plurality of rings comprising the second ring varies as a function of angular position about the vessel.

11. The apparatus according to claim 1, wherein a thickness of the first ring varies as a function of angular position about the first ring.

12. The apparatus according to claim 11, wherein the first ring comprises a plurality of sections and a thickness of the plurality of sections varies as a function of angular position about the vessel.

13. The apparatus according to claim 12, wherein each section of the plurality of sections has a uniform thickness.

14. The apparatus according to claim 11, wherein the first ring is thicker at a first angular location relative to the vessel than at a second angular location displaced 180 degrees from the first angular location.

15. The apparatus according to claim 11, wherein the second ring is a single ring and a thickness of the second ring varies as a function of angular position relative to the vessel.

16. The apparatus according to claim 11, wherein the second ring comprises a plurality of rings, and wherein for at least one ring of the plurality of rings comprising the second ring, a thickness of the at least one ring varies as a function of angular position relative to the vessel.

17. The apparatus according to claim 1, wherein the second ring comprises one or more rings, and a thickness of at least one of the one or more rings comprising the second ring varies as a function of angular position relative to the vessel.

18. The apparatus according to claim 17, wherein a thickness of the first ring varies as a function of angular position relative to the vessel.

19. An apparatus for heating a molten material comprising:
    a vessel having an electrically conductive exterior wall portion;
    an electrically conductive flange comprising a plurality of rings including at least a first ring having a first composition and a second ring having a second composition different from the first composition, the second ring joined to the vessel about a circumference of the vessel; and
    wherein a width of at least one of the first or second rings varies as a function of angular position relative to the vessel.

20. The apparatus according to claim 19, wherein a thickness of at least one of the first or second rings varies as a function of angular position relative to the vessel.

21. An apparatus for heating a molten material comprising:
    a vessel having an electrically conductive exterior wall portion;
    an electrically conductive flange comprising a plurality of rings including at least a first ring having a first composition and a second ring having a second composition different from the first composition, the second ring joined to the vessel about a circumference of the vessel; and
    wherein a thickness of at least one of the first or second rings varies as a function of angular position relative to the vessel.

22. The apparatus according to claim 21, wherein a width of at least one of the first or second rings varies as a function of angular position relative to the vessel.

* * * * *